US012736626B2

(12) United States Patent
Munir et al.

(10) Patent No.: US 12,736,626 B2
(45) Date of Patent: Sep. 15, 2026

(54) SYSTEMS AND METHODS FOR CAMERA-TO-RADAR KNOWLEDGE DISTILLATION

(71) Applicant: Robert Bosch GmbH, Stuttgart (DE)

(72) Inventors: Sirajum Munir, Pittsburgh, PA (US); Wenpeng Wang, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 464 days.

(21) Appl. No.: 18/351,816

(22) Filed: Jul. 13, 2023

(65) Prior Publication Data

US 2025/0020774 A1 Jan. 16, 2025

(51) Int. Cl.

| | |
|---|---|
| ***G01S 7/41*** | (2006.01) |
| ***G01S 13/90*** | (2006.01) |
| ***G01S 13/931*** | (2020.01) |
| ***G06V 10/82*** | (2022.01) |

(52) U.S. Cl.

CPC .......... *G01S 7/417* (2013.01); *G01S 13/9027* (2019.05); *G01S 13/931* (2013.01); *G06V 10/82* (2022.01); *G01S 2013/9322* (2020.01); *G06V 2201/07* (2022.01)

(58) Field of Classification Search

CPC .... G01S 7/417; G01S 13/9027; G01S 13/931; G01S 2013/9322; G06V 10/82; G06V 2201/07

See application file for complete search history.

(56) References Cited

U.S. PATENT DOCUMENTS

| | | | | |
|---|---|---|---|---|
| 11,971,955 | B1 * | 4/2024 | Chakraborty | G06F 3/04845 |
| 12,189,026 | B1 * | 1/2025 | Alferdaous Alazem | G01S 7/403 |
| 2021/0027113 | A1 * | 1/2021 | Goldstein | G06F 18/24 |
| 2022/0196798 | A1 * | 6/2022 | Chen | G01S 7/354 |
| 2022/0261593 | A1 * | 8/2022 | Yu | G06F 18/214 |
| 2022/0357441 | A1 * | 11/2022 | Ansari | G01S 13/867 |
| 2024/0096105 | A1 * | 3/2024 | Zhao | G06V 20/58 |
| 2024/0104913 | A1 * | 3/2024 | Redford | G06V 20/56 |
| 2024/0185719 | A1 * | 6/2024 | Wei | G01S 13/931 |

OTHER PUBLICATIONS

R. Achanta, A. Shaji, K. Smith, A. Lucchi, P. Fua, and S. Susstrunk. SLIC Superpixels Compared to State-of-the-Art Superpixel Methods. IEEE transactions on pattern analysis and machine intelligence,vol. 34(11), pp. 2274-2281, Nov. 2012.

(Continued)

*Primary Examiner* — Nazra Nur Waheed

(74) *Attorney, Agent, or Firm* — Maginot, Moore & Beck LLP

(57) ABSTRACT

A workflow is described herein for training a radar data processing model with a reduced requirement for annotated training data. The training workflow leverages an image sensor, such as a camera, that is synchronized with a radar sensor to capture synchronous image and radar point cloud data. The training workflow utilizes a self-supervised knowledge distillation process to pre-train the radar data processing model on the unannotated synchronous image and radar point cloud data, using a pre-trained image model. Subsequently, the radar data processing model is fine-tuned with a limited set of annotated radar point cloud data, thereby greatly reducing the human annotation burden.

20 Claims, 5 Drawing Sheets

(56) References Cited

OTHER PUBLICATIONS

H. Caesar, V. Bankiti, A. H. Lang, S. Vora, V. E. Liong, Q. Xu, A. Krishnan, Y. Pan, G. Baldan, and O. Beijbom, nuScenes: A Multimodal dataset for autonomous driving, In Proceedings of the IEEE/CVF conference on computer vision and pattern recognition, pp. 11621-11631, 2020.
C. Choy, J. Gwak, and S. Savarese. 4D Spatio-Temporal ConvNets: Minkowski Convolutional Neural Networks. In Proceedings of the IEEE/CVF Conference on Computer Vision and Pattern Recognition, pp. 3075-3084, 2019.
P. F. Felzenszwalb and D. P. Huttenlocher. Efficient Graph-Based Image Segmentation. International Journal of Computer Vision, 59(2), pp. 167-181, 2004.
H. Huang, L. Lin, R. Tong, H. Hu, Q. Zhang, Y. Iwamoto, X. Han, Y.W. Chen, and J. Wu. UNET 3+: A Full-Scale Connected UNET for Medical Image Segmentation. In ICASSP 2020-2020 IEEE International Conference on Acoustics, Speech and Signal Processing (ICASSP), pp. 1055-1059. IEEE, 2020.
A. Popov, P. Gebhardt, K. Chen, R. Oldja, H. Lee, S. Murray, R. Bhargava, and N. Smolyanskiy. NVRadarNet: Real-Time Radar obstacle and Free Space Detection for Autonomous Driving. arXiv preprint arXiv:2209.14499v2, 2023.
C. Sautier, G. Puy, S. Gidaris, A. Boulch, A. Bursuc, and R. Marlet. Image-to-Lidar Self-Supervised Distillation for Autonomous Driving Data. In Proceedings of the IEEE/CVF Conference on Computer Vision and Pattern Recognition, pp. 9891-9901, 2022.
S. Xie, J. Gu, D. Guo, C. R. Qi, L. Guibas, and O. Litany. PointContrast: Unsupervised Pre-training for 3D Point Cloud Understanding. In European conference on computer vision, pp. 574-591. Springer, 2020.
Z. Zhang, R. Girdhar, A. Joulin, and I. Misra. Self-Supervised Pretraining of 3D Features on any Point-Cloud. In Proceedings of the IEEE/CVF International Conference on Computer Vision, pp. 10252-10263, 2021.

* cited by examiner

SYSTEMS AND METHODS FOR CAMERA-TO-RADAR KNOWLEDGE DISTILLATION

FIELD

The device and method disclosed in this document relates to machine learning and, more particularly, to training a radar data processing model.

BACKGROUND

Unless otherwise indicated herein, the materials described in this section are not admitted to be the prior art by inclusion in this section.

The vast development of millimeter-wave radars has made them widely integrated into commercial vehicles to collect accurate distance, direction, and velocity information from objects in the surrounding environment, which is an important component in autonomous driving systems. These capabilities make radar a perfect candidate for object detection, which is one of the most critical tasks in autonomous driving solutions, especially in extreme conditions such as fog, rain, and other vision-denied scenarios. Radar can enable more accurate object detection and image segmentation by leveraging the measurements of distance, direction, and velocity with respect to an object. Likewise, there is great potential for radar systems to be adopted in various other scenarios such as indoor human detection, smart vacuum cleaners, or object detection for outdoor self-driving.

However, due to the sparsity limitation of radar points, existing radar-based approaches require extensive human effort to annotate a large number of radar point clouds and build a large dataset, making it quite costly to use existing radar-based approaches. What is needed is an approach that reduces reduce the human annotation burden on radar point clouds so that radar-based approaches can be deployed at a lower cost.

SUMMARY

A method is described herein for training a first neural network to perform a radar data processing task. The method comprises receiving, with a processor, a plurality of training data pairs, each respective training data pair in the plurality of training data pairs including a respective image and a respective radar point cloud, which were captured synchronously with one another of a same scene. The method further comprises training, with the processor, in a first phase based on the plurality of training data pairs, the first neural network to extract features from radar point clouds using a second neural network that is pre-trained to extract features from images. The method further comprises receiving, with the processor, a plurality of annotated radar point clouds, the annotated radar point clouds having labels corresponding to a radar data processing task. The method further comprises further training, with the processor, in a second phase based on the plurality of annotated radar point clouds, the first neural network to perform the radar data processing task.

A non-transitory computer-readable medium is described herein. The non-transitory computer-readable medium stores program instructions that, when executed by a processor, cause the processor to receive a plurality of training data pairs, each respective training data pair in the plurality of training data pairs including a respective image and a respective radar point cloud, which were captured synchronously with one another of a same scene. The program instructions, when executed by the processor, further cause the processor to train, in a first phase based on the plurality of training data pairs, the first neural network to extract features from radar point clouds using a second neural network that is pre-trained to extract features from images. The program instructions, when executed by the processor, further cause the processor to receive a plurality of annotated radar point clouds, the annotated radar point clouds having labels corresponding to a radar data processing task. The program instructions, when executed by the processor, further cause the processor to further train, in a second phase based on the plurality of annotated radar point clouds, the first neural network to perform the radar data processing task.

BRIEF DESCRIPTION OF THE DRAWINGS

The foregoing aspects and other features of the methods are explained in the following description, taken in connection with the accompanying drawings.

DETAILED DESCRIPTION

Figure 1:
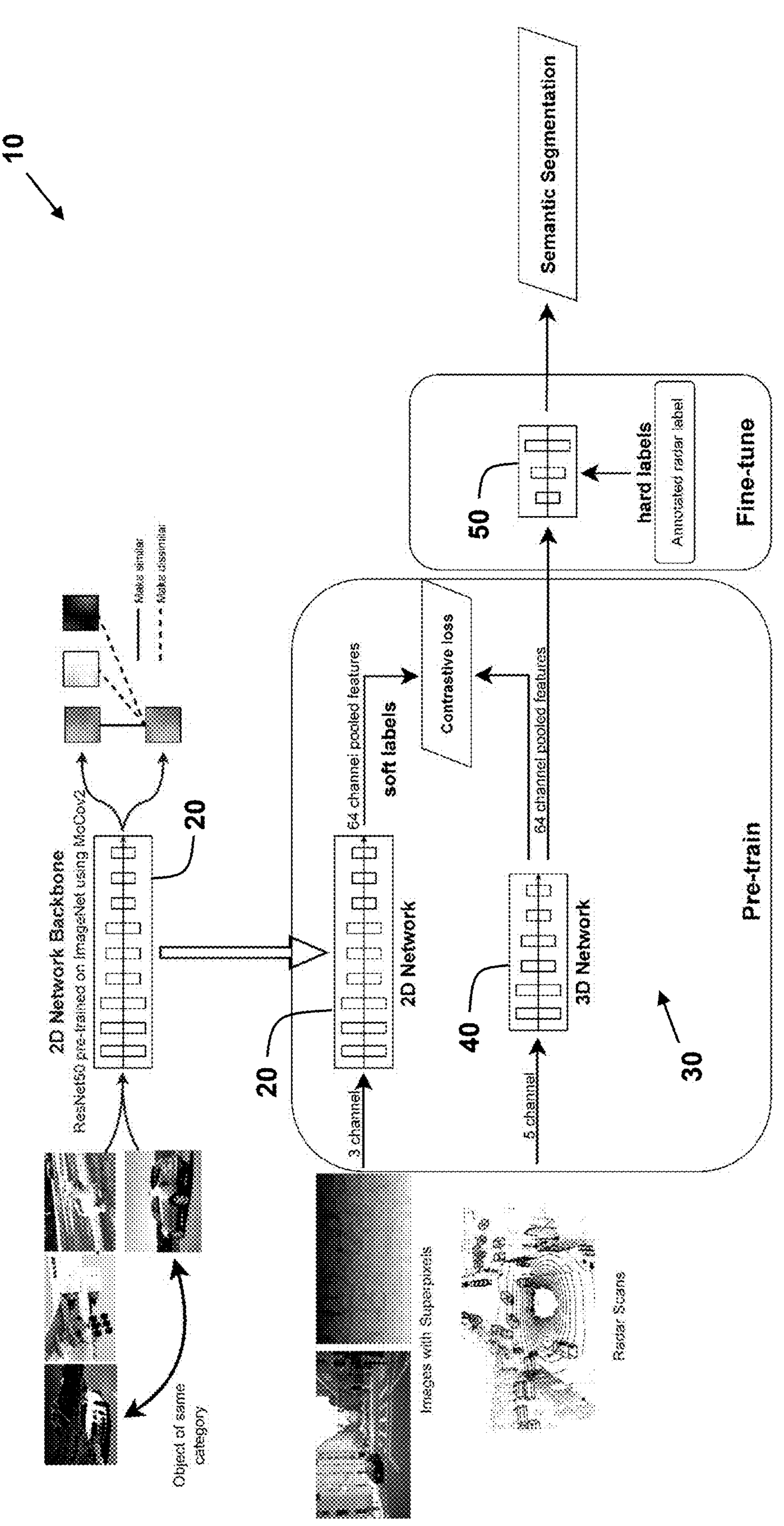
FIG. 1 summarizes a workflow for training a radar data processing model, with a reduced requirement for annotated training data.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

FIG. 1 summarizes a workflow 10 for training a radar data processing model 30, with a reduced requirement for annotated training data. In the illustrated embodiments, the radar data processing model 30 is a U-net based model having an encoder 40 followed by a decoder 50. Particularly, the encoder 40 is configured to extract features from a radar point cloud and the decoder 50 is configured to perform a downstream task on the radar point cloud based on the extracted features. The training workflow 10 leverages an image sensor, such as a camera, that is synchronized with a radar sensor to capture synchronous image and radar point cloud data. The training workflow 10 utilizes a self-supervised knowledge distillation process to pre-train the radar data processing model 30 on the unannotated synchronous image and radar point cloud data, before fine-tuning with a limited set of annotated radar point cloud data, thereby greatly reducing the human annotation burden.

The training workflow 10 consists of two phases: pre-training and fine-tuning. In the pre-training phase, a pre-trained image model 20 is leveraged to pre-train the encoder 40 of the radar data processing model 30. Particularly, pairs of aligned images and radar point clouds are input into the pre-trained image model 20 and into the encoder 40 of the radar data processing model 30, respectively. The encoder 40 of the radar data processing model 30 is pre-trained by enforcing a matching between 2D pixel features extracted from the aligned images and 3D point features extracted from the radar point clouds. In the fine-tuning phase, the decoder 50 of the radar data processing model 30 is trained using a small set of annotated radar point cloud data having labels corresponding to some downstream task that is to be learned, such as object detection or semantic segmentation.

The training workflow 10, thus, advantageously transfers knowledge from existing camera image-based models and significantly reduces the human effort required for labeling radar point cloud data, while achieving comparable performance. Particularly, the radar data processing model 30 is pre-trained on a large amount of non-annotated data and later only requires small set of annotated data for fine-tuning.

The training workflow 10 can be useful for a wide range of applications including autonomous driving, surveillance and public safety applications, intrusion detection, and vulnerable pedestrian detection. A system that captures co-located camera and radar data can be used for training and, after training, the radar can operate on its own to detect objects of interest and distance from the radar sensor using the proposed method. In autonomous vehicle applications, such radar-only operation can help with avoiding obstacles in low visibility scenarios. For surveillance and public safety applications, it can notify the officials or security guards when an intrusion is detected, or trigger an alarm.

Exemplary Hardware Embodiment

Figure 2:
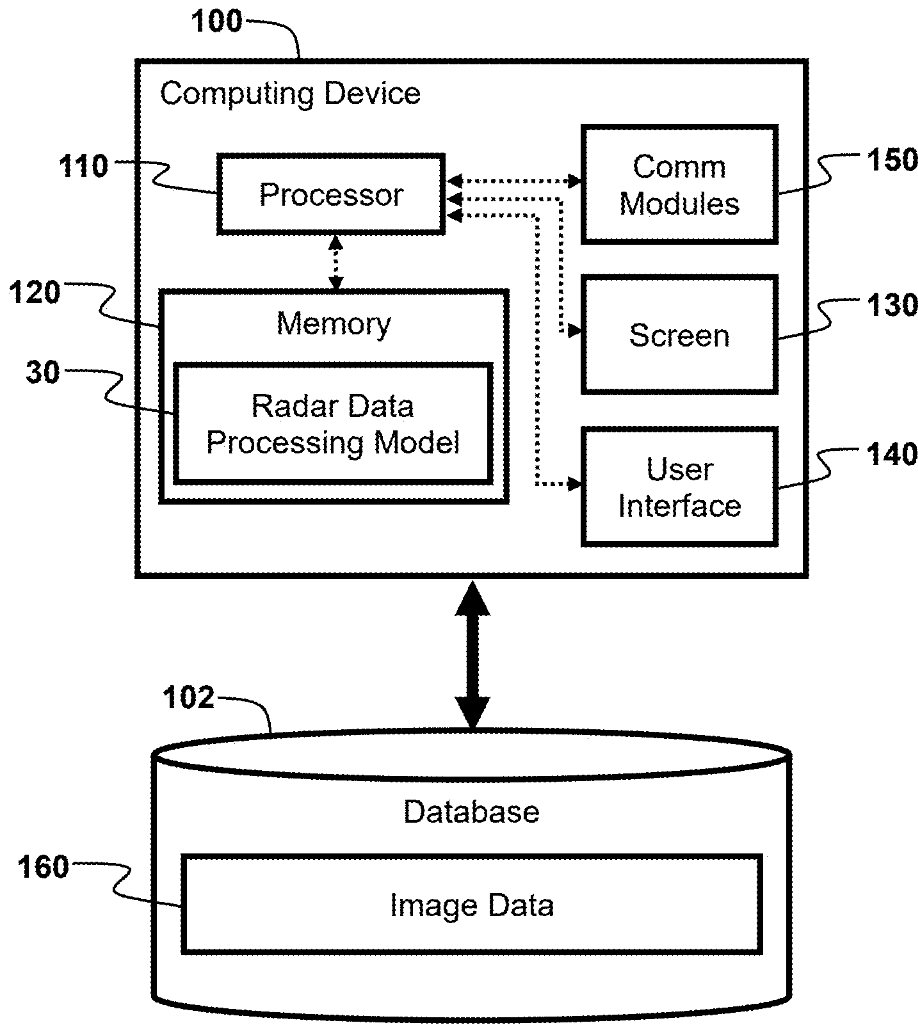
FIG. 2 shows an exemplary embodiment of the computing device that can be used to train the radar data processing model.

FIG. 2 shows an exemplary embodiment of the computing device 100 that can be used to train the radar data processing model 30 for performing a radar data processing task, such as object detection or semantic segmentation. Likewise, the computing device 100 may be used to operate a previously trained radar data processing model 30 to perform the radar data processing task. The computing device 100 comprises a processor 110, a memory 120, a display screen 130, a user interface 140, and at least one network communications module 150. It will be appreciated that the illustrated embodiment of the computing device 100 is only one exemplary embodiment is merely representative of any of various manners or configurations of a server, a desktop computer, a laptop computer, mobile phone, tablet computer, or any other computing devices that are operative in the manner set forth herein. In at some embodiments, the computing device 100 is in communication with a database 102, which may be hosted by another device or which is stored in the memory 120 of the computing device 100 itself.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes an ethernet adaptor or a Wi-Fi® module configured to enable communication with a wired or wireless network and/or router (not shown) configured to enable communication with various other devices. Additionally, the network communications module 150 may include a Bluetooth® module (not shown), as well as one or more cellular modems configured to communicate with wireless telephony networks.

In at least some embodiments, the memory 120 stores program instructions of the radar data processing model 30 that, once the training is performed, are configured to perform a radar data processing task. In at least some embodiments, the database 102 stores a plurality of training data pairs, each respective training data pair including a respective image and a respective radar point cloud, which were captured synchronously with respect to a scene. Additionally, in at least some embodiments, the database 102 stores a plurality of annotated radar point clouds having labels corresponding to the radar data processing task that is to be learned.

Method of Training a Radar Data Processing Model

A variety of operations and processes are described below for operating the computing device 100 to develop and train the radar data processing model 30 for performing a radar data processing task. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of the database 102 to perform the task or function. Additionally, the steps of the methods may be performed in any feasible chronological order, regardless of the order shown in the figures or the order in which the steps are described.

Figure 3:
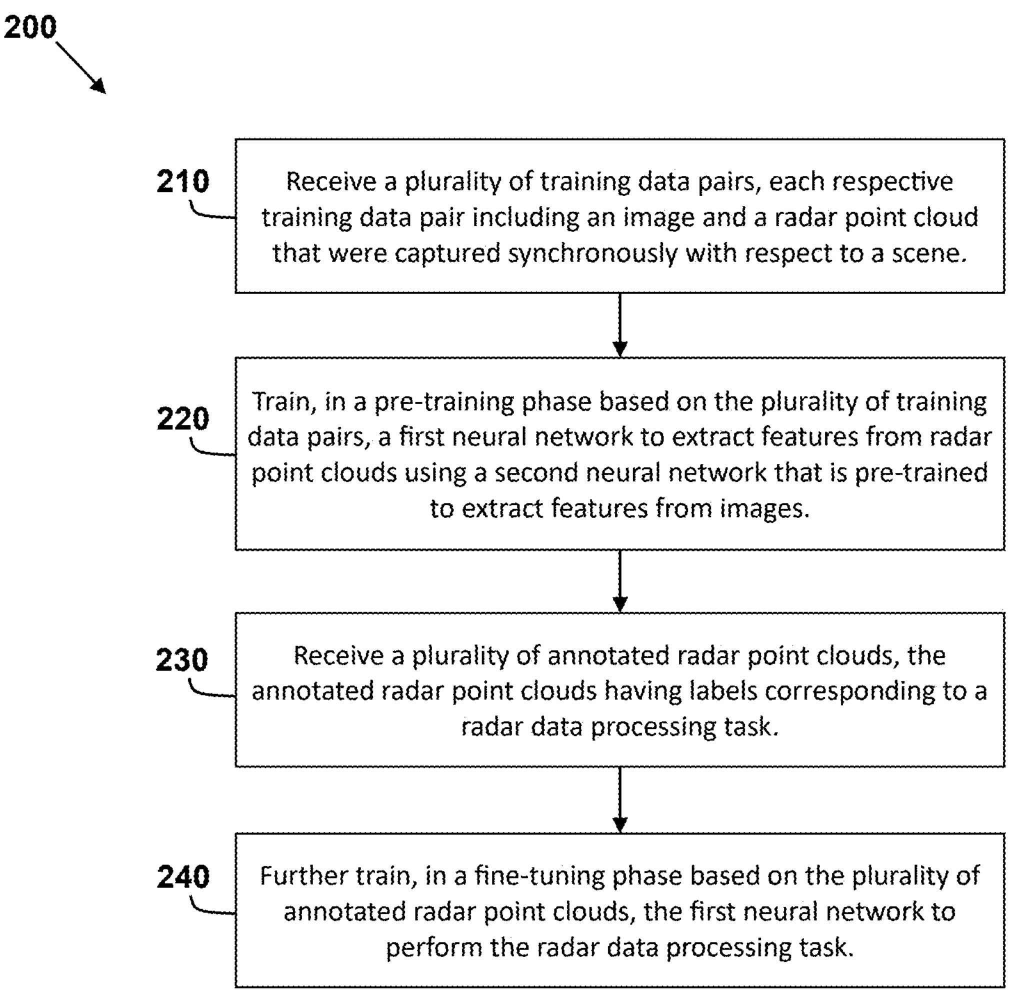
FIG. 3 shows a flow diagram for a method for training a radar data processing model configured to perform a radar data processing task.

FIG. 3 shows a flow diagram for a method 200 for training a radar data processing model configured to perform a radar data processing task. A key insight and advantage of the method 200 is that object-level representation can be transferred between models using a contrastive learning algorithm. Particularly, by self-supervised knowledge distillation, the encoder 40 of the radar data processing model 30 learns to extract latent representations of radar point cloud data by leveraging existing image models and using aligned radar and image data. Additionally, the method 200 advantageously leverages superpixels and superpoints. Particularly, instead of conducting distillation per point or per pixel, the method 200 groups points and pixels that belong to the same object and perform contrastive learning to distill the knowledge from camera to radar. The method 200 enforces a matching between pairs of corresponding 3D radar point features and the 2D images pixel features, using a contrastive loss.

The method 200 begins with receiving a plurality of training data pairs, each respective training data pair including an image and a radar point cloud that were captured synchronously with respect to a scene (block 210). Particularly, the processor 110 receives and/or the database 102 stores a plurality of training data pairs $\langle P_t, I_t \rangle$. Each training data pair includes a radar point cloud, denoted $P_t=(p_i)_{i=1,2,\ldots,n} \subseteq \mathbb{R}^{N\times Q}$, which is captured by a radar sensor, where t indicates a time at which the radar point cloud $P_t$ was captured, i is an index of each particular radar data point in the radar point cloud $P_t$, N is a total number of points in the radar point cloud $P_t$, and Q is the dimension of each radar data point in the radar point cloud $P_t$. Each training data pair also includes a corresponding image, denoted $I_t \subseteq \mathbb{R}^{M\times 3}$, which is captured by a camera or other 2D image sensor (e.g., depth camera, infrared camera, etc.) synchronously with corresponding the radar point cloud radar at the same time t, where M represents the number of pixels in the image $I_t$. It should be appreciated that the plurality of training data pairs need not be manually annotated with any ground truth labels associated with the radar data processing task.

The method 200 continues with training, in a pre-training phase based on the plurality of training data pairs, a first neural network to extract features from radar point clouds using a second neural network that is pre-trained to extract features from images (block 220). Particularly, in a pre-training phase, the processor 110 trains the radar data processing model 30, denoted $f_\theta(\bullet)$, to extract features from radar point clouds using the pre-trained image model 20, denoted $h_\omega(\bullet)$, that is pre-trained to extract features from images, based on the plurality of training data pairs $\langle P_t, I_t \rangle$. The radar data processing model 30 is trained in self-supervised fashion by aligning the output of the features $f_\theta(P)$ with the corresponding image model output $h_\omega(I)$ from the pre-trained image model 20. In at least one embodiment, parameters (e.g., kernel weights, model coefficients, etc.) of the pre-trained image model 20 are frozen during the training of the radar data processing model 30 in the pre-training phase.

In some embodiments, the pre-trained image model 20, $h_\omega(\bullet)$: $\mathbb{R}^{M\times 3}$, is a neural network configured to take 3-dimensional RGB image data as input and output a D-dimensional image feature map $h_\omega$, where M represents the number of pixels in the image. In some embodiments, the pre-trained image model 20 has an encoder-decoder architecture (not shown). In one embodiment, the encoder of the pre-trained image model 20 is a multi-layer convolutional network (e.g., output size 2048), and the decoder of the pre-trained image model 20 is a simple convolutional layer (e.g., output size 64). In one embodiment, the pre-trained image model 20 is a ResNet-50 pre-trained in a self-supervised manner on ImageNet with MoCov2, followed by a pointwise projection using a linear layer and l2-normalization. In some embodiments, the However, it should be appreciated that a wide variety of pre-existing models for extracting features from 2D image data can be utilized.

In some embodiments, the radar data processing model 30, $f_\theta(\bullet)$: $\mathbb{R}^{N\times Q'}$, is a neural network configured to take as input Q' useful inputs from Q and output a D-dimensional radar feature map $f_\theta$, where N is a total number of points in the radar point cloud, and Q is the dimension of each radar data point in the radar point cloud. In at least one embodiment, the radar data processing model 30 has a sparse residual U-Net architecture, followed by a pointwise projection with a linear layer and l2-normalization.

In the pre-training phase, for each training data pair $\langle P_t, I_t \rangle$, the processor 110 provides the respective radar point cloud $P_t$ as an input to the encoder 40 of the radar data processing model 30 and provides the respective image $I_t$ as an input to the pre-trained image model 20. Using the pre-trained image model 20, the processor 110 determines a D-dimensional image feature map $h_\omega(I)$ based on the image $I_t$. Likewise, using the encoder 40 of the radar data processing model 30, the processor 110 determines a D-dimensional radar feature map $f_\theta(P)$ based on the radar point cloud $P_t$. The processor 110 determines a training loss based on a comparison of the radar feature map $h_\omega(P)$ and the image feature map $h_\omega(I)$. In at least one embodiment, the training loss is a contrastive loss. Finally, the processor 110 refines the radar data processing model 30 (e.g., updates model coefficients, weights, parameters, etc.) based on the determined training loss.

In at least some embodiments, the processor 110 determines a mapping between (i) points of the radar point clouds $P_t$ in the plurality of training data pairs $\langle P_t, I_t \rangle$ and pixels of the images $I_t$ in the plurality of training data pairs $\langle P_t, I_t \rangle$. Particularly, the first step in the knowledge distillation is to align the radar point cloud with the camera image. Based on a known relative pose of the radar sensor and the camera sensor, the processor 110 projects each radar point $p_i$ onto the camera frame to acquire a pixel location on the image $I_t$. More particularly, the processor 110 builds a mapping $\varepsilon_p$ $\mathbb{R}^{Q} \rightarrow \{0\} \cup \{1,2,3,\ldots,M\}$, which takes as each 3D radar point $p_i$ and outputs an index of the corresponding 2D pixel in image $I_t$, or 0 if this point is not in the view of the camera. The processor 110 uses the mapping $\varepsilon_p$ to calculate the training loss during the pre-training phase.

It should be appreciated that, simply distilling from knowledge on a pixel-to-radar point basis might not transfer useful knowledge to the radar data processing model 30, thus hampering the goal of using an existing the pre-trained image model 20 to pre-train the radar data processing model 30, without using any human annotations. This is because the radar point clouds from the radar sensor have a different resolution compared to images from the camera sensor. Moreover, radar is able to recognize object level information instead of pixel level information. Thus, it is advantageous for the knowledge distillation process to instead distill object-level but not overly-coarse scene level knowledge from the pre-trained image model 20 to the radar data processing model 30. To this end, in at least some embodiments, superpixels and superpoints are leveraged to improve the knowledge distillation process.

Figure 4:
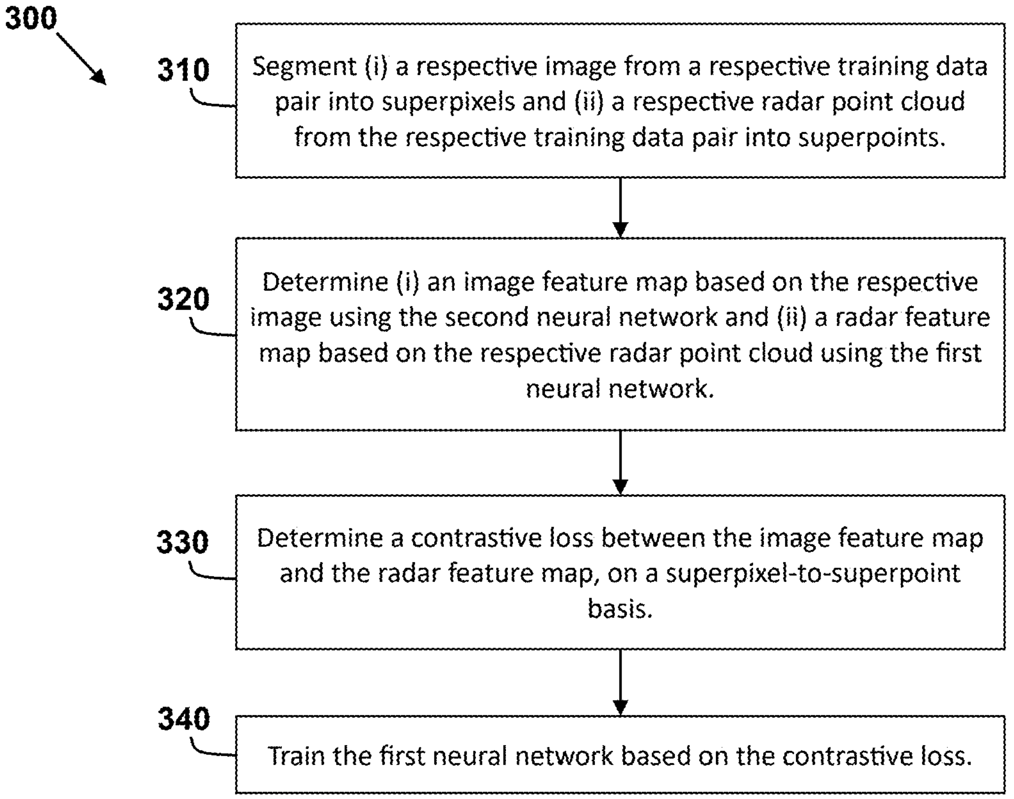
FIG. 4 shows a flow diagram for a method for pre-training the radar data processing model, in the pre-training phase, that leverages superpixels and superpoints

FIG. 4 shows a flow diagram for a method 300 for pre-training the radar data processing model, in the pre-training phase, that leverages superpixels and superpoints. It should be appreciated that the method 300 is one exemplary embodiment of the process of block 220 in the method 200 of FIG. 3.

The method 300 begins with segmenting (i) a respective image from a respective training data pair into superpixels and (ii) a respective radar point cloud from the respective training data pair into superpoints (block 310). Particularly, in the pre-training phase, for each training data pair $\langle P_t, I_t \rangle$, the processor 110 determines a segmented image by segmenting the respective image $I_t$ into a plurality of superpixels, denoted $$S_1^t, S_2^t, \ldots, S_{M'}^t,$$

where M' is the total number of superpixels. As used herein, a "superpixel" refers to a group or subset of pixels within an image. In at least some embodiments, the pixels of a superpixel are contiguously arranged with the image. In some embodiments, a superpixel includes pixels that are visually similar, e.g., that have a color and/or brightness that are within a threshold similarity of each other. It should be appreciated that such superpixels generally provide more meaningful object-level information compared to individual pixels.

Similarly, in the pre-training phase, for each training data pair $\langle P_t, I_t \rangle$, the processor 110 determines a segmented radar point cloud by segmenting the respective radar point cloud $P_t$ into a plurality of superpoints, denoted $$O_1^t, O_2^t, \ldots, O_{N'}^t,$$

where N' is the total number of superpoints. As used herein, a "superpoint" refers to a group of points within a point cloud. In some embodiments, a superpoint includes points that correspond to a same object. In this way, it should be appreciated that, similar to the superpixels, the superpoints generally provide more meaningful object-level information compared to individual points.

Figure 5A:
FIG. 5A-5C shows an exemplary segmentation of an image into superpixels.
Figure 5B:
Figure 5C:
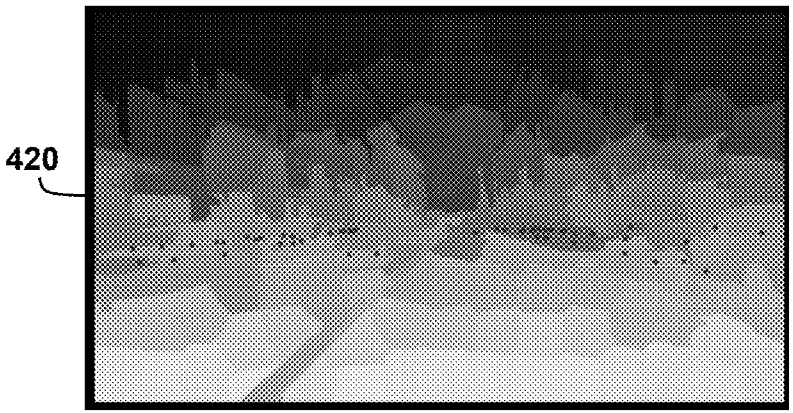

As detailed further below, the superpixels and superpoints may be defined in a variety of ways to enhance the knowledge distillation process. In a first approach for defining the superpixels and superpoints, the processor 110 determines the segmented image and, thus, defines the superpixels by applying a machine learning model, such as an image segmentation algorithm, e.g., the graph-based Felzenszwalb and Huttenlocher (FH) segmentation algorithm, or a pixel clustering algorithm, e.g., the Simple Linear Iterative Clustering (SLIC) algorithm, to the respective image $I_t$. FIG. 5A-5C shows an exemplary segmentation of an image into superpixels. Particularly, FIG. 5A shows an original image 400 captured by a camera in an urban environment with cars and buildings. FIG. 5B shows a segmented image 410 generated by segmenting the image 400 into superpixels using the FH algorithm. FIG. 5C shows a segmented image 420 generated by segmenting the image 400 into superpixels using the SLIC algorithm.

Next, the processor 110 determines the segmented radar point cloud and, thus, defines the superpoints by matching each point in the respective radar point cloud $P_t$ to a respective superpixel in the respective image $I_t$, for example using the mapping $\varepsilon_p$. With reference again to FIG. 5C, radar points (illustrated as dots) are shown projected onto the segmented image 420. The processor 110 defines each superpoint of the segmented radar point cloud as a group of radar points that map to a same superpixel in the respective segmented image. In other words, each superpoint $$O_i^0$$

contains a set of matched radar points that map within the corresponding superpixel $$S_i^0.$$

It should be appreciated that, due to the sparsity of radar point clouds, some superpixels $$S_i^0$$

will not map to any points from the radar point cloud. Thus, in at least some embodiments, such superpixels that correspond to empty superpoints and/or do not map to any points are not used in determining the training loss.

In a second approach for defining the superpixels and superpoints, conversely to the first approach, the processor 110 determines the segmented radar point cloud and, thus, defines the superpoints by applying a machine learning model, such as a point clustering algorithm, e.g., the DBScan algorithm, to the respective radar point cloud $P_t$.

Next, the processor 110 initially defines the superpixels of the segmented image by applying an image segmentation algorithm or a pixel clustering algorithm, as similarly discussed with respect to the first approach. However, these initially defined superpixels are further consolidated by the processor 110 by matching each initially defined superpixel to a respective superpoint in the respective radar point cloud $P_t$. The processor 110 defines each final superpixel of the segmented image as a group of the initially defined superpixels that map to a same superpoint in the respective segmented radar point cloud. Alternatively, the application of the image segmentation algorithm or pixel clustering algorithm can be omitted in the second approach and, instead, the processor 110 simply matches each original pixel in the respective image $I_t$ to a respective superpoint in the respective radar point cloud $P_t$ to define the superpixels. In other words, each final superpixel $$S_i^0$$

contains a set of matched pixels (or initially defined superpixels) that map within the corresponding superpoint $$O_i^0.$$

It should be appreciated that, due to the sparsity of radar point clouds, some superpixels $$S_i^0$$

will not map to any points from the radar point cloud. Thus, in at least some embodiments, such superpixels that correspond to empty superpoints and/or do not map to any points are not used in determining the training loss.

Using the second approach for defining the superpixels and superpoints, the clustering method is leveraged to differentiate radar points that belong to different objects. When radar points that mostly belong to the same object are clustered into the same group, the aligned superpixels are combined together to form an object-level representation, overcoming the issue of over-segmentation of the image. However, due to the sparsity of radar point clouds, the shape of points is arbitrary with varying densities, and some outliers which introduce extra difficulties in selecting the right clustering method.

In a third approach for defining the superpixels and superpoints, similar to the second approach the processor 110 determines the processor 110 determines the segmented radar point cloud and, thus, defines the superpoints by applying a machine learning model, such as a point clustering algorithm, e.g., the DBScan algorithm. However, rather than applying the to the point clustering algorithm or other machine learning model only to the respective radar point cloud $P_t$, the processor 110 generates a combined radar point cloud by combining the respective radar point cloud $P_t$ with a predetermined number of adjacent radar point clouds that were captured at immediately previous or immediately subsequent times compared to the time t at which the respective radar point cloud $P_t$ was captured, e.g., the immediately previous radar point cloud $P_{t-1}$ and the immediately subsequent radar point cloud $P_{t+1}$. This combined radar point cloud helps to overcome the sparsity issue of radar point clouds. The processor 110 determines the segmented radar point cloud and, thus, defines the superpoints by applying a machine learning model, such as a point clustering algorithm, e.g., the DBScan algorithm or the Hungarian method, to the combined radar point cloud. Next, the processor 110 defines the superpixels of the segmented image using the same processes discussed with respect to the second approach.

With continued reference to FIG. 4, the method 300 continues with determining (i) an image feature map based on the respective image using the second neural network and (ii) a radar feature map based on the respective radar point cloud using the first neural network (block 320). Particularly, as similarly discussed above, in the pre-training phase, for each training data pair $\langle P_t, I_t \rangle$, the processor 110 provides the respective radar point cloud $P_t$ as an input to the encoder 40 of the radar data processing model 30 and provides the respective image $I_t$ as an input to the pre-trained image model 20. Using the pre-trained image model 20, the processor 110 determines a D-dimensional image feature map $h_\omega(I)$ based on the image $I_t$. Likewise, using the encoder 40 of the radar data processing model 30, the processor 110 determines a D-dimensional radar feature map $f_\theta(P)$ based on the radar point cloud $P_t$.

The method 300 continues with determining a contrastive loss between the image feature map and the radar feature map, on a superpixel-to-superpoint basis (block 330). Particularly, the processor 110 determines a contrastive loss based on the radar feature map $f_\theta$ and the image feature map $h_\omega$, and using the mapping $\varepsilon_p$. However, in order to provide a more useful contrastive loss, the processor 110 determines the contrastive loss on a superpixel-to-superpoint basis. It should be appreciated that this superpixel-level contrastive loss has several advantages. Superpixel-level contrastive loss gives the same weights to all regions in contrastive loss regardless of radar point sampling density. Additionally, superpixel-level contrastive loss makes the contrastive loss small enough between the corresponding superpixels and superpoints, but big enough to differentiate feature from another superpixel in different categories in the same scene. Determining the contrastive loss between the two feature maps on a superpixel-to-superpoint basis helps to ensure that the knowledge distillation is at the object level. Compared to pixel-level contrastive learning, determining contrastive loss on a superpixel-to-superpoint basis does not face the problem of contrast between almost identical points inside a superpixel, which would create a "false negative" problem for self-supervised learning. Conversely, determining contrastive loss on scene-level, which normally contrasts the global representation of an entire radar point cloud to the entire corresponding camera image, is not able to differentiate object-level differences and provides limited diversity since most scenes have the same class of objects, e.g. cars, pedestrians, etc.

Thus, the processor 110 determines the contrastive loss based on the superpoints of the segmented radar feature map $f_\theta$(i.e., the respective superpoint feature output of each superpoint in the respective radar point cloud) and the superpixels of the segmented image feature map $h_\omega$(i.e., the respective superpixel feature output of each superpixel in the respective image). The processor 110 matches each superpoint in the respective radar point cloud to a respective superpixel in the respective image, and determines the contrastive loss based on the matched superpoint feature outputs and superpixel feature outputs. Particularly, in at least one embodiment, for a given camera image $I_c$, the processor 110 computes one contrastive loss from each corresponding superpixel and superpoint. In order to do this, the processor 110 first needs to acquire the superpoint feature output for each superpoint and the superpixel feature output of each superpixel.

When the superpixels and superpoints are defined, the processor 110 can align the original radar feature map $f_\theta$ having original dimensions N×D with the original image feature map $h_\omega$ having original dimensions M×D, using the defined superpixels and superpoints. Particularly, based on the based on the original the image feature map $h_\omega$ and the original radar feature map $f_\theta$, the processor 110 determines a segmented image feature map $h_\omega$ having dimensions M'×D and a segmented radar feature map $f_\theta$ having dimensions N'×D. In other words, the dimensions of the image feature map $h_\omega: \mathbb{R}^{M\times 3} \rightarrow \mathbb{R}^{M'\times D}$ output by the pre-trained image model 20 are resolved to have the dimensions M×3→M'×D and the dimensions of the radar feature map $f_\theta: \mathbb{R}^{N\times Q'} \rightarrow \mathbb{R}^{N'\times D}$ output by the encoder 40 are resolved to have the dimensions N×Q'→N'×D.

The processor 110 determines the segmented image feature map $h_\omega$ by determining, for each superpixel in the respective image $I_t$, a respective superpixel feature output $h_{\mathcal{K}}^{C}$, based on the features in the original image feature map $h_\omega$ corresponding to the pixels of the respective superpixel. In one embodiment, the processor 110 determines the superpixel feature output $h_{\mathcal{K}}^{C}$ for each superpixel using average-pooling, i.e., as an average of the feature outputs of each pixel in the superpixel.

The processor 110 determines the segmented radar feature map $f_\theta$ by determining, for each superpoint in the respective radar point cloud $P_t$, a respective superpoint feature output $f_{\mathcal{K}}^{C}$, based on the features in the original radar feature map $f_\theta$ corresponding to the points of the respective superpoint. However, due to their sparse nature of the radar point clouds, simply performing average-pooling to determine each superpoint feature output $f_{\mathcal{K}}^{C}$ might not sufficiently leverage the spatial information between points. Instead, in one embodiment, the processor 110 determines the superpoint feature output $f_{\mathcal{K}}^{C}$ for each superpoint using a weighted-average-pooling, e.g., an average in which the features of each point are weighted based on the average distance to other points inside the superpoint, giving points that are closer to other points in the superpoint a higher weight over points that are far away from other points in the superpoint.

Thus, the output features of $k^{th}$ matched superpixel-to-superpoint regions can be represented as:

$$f_{\mathcal{K}}^{C} = \frac{1}{|O_{\mathcal{K}}^{C}|}\sum_{i \in O_{\mathcal{K}}^{C}} f_\theta \cdot (P_k)_i, \tag{1}$$

$$h_{\mathcal{K}}^{C} = \frac{1}{|S_{\mathcal{K}}^{C}|}\sum_{i \in S_{\mathcal{K}}^{C}} h_\omega \cdot (I_k)_i. \tag{2}$$

where C denotes the respective training data pair and $\mathcal{K}$ denotes the respective matched superpixel and superpoint pair within the training data pair.

The processor 110 determines the instance-wise contrastive loss $\mathcal{L}$ based on the matched superpoint feature output $f_{\mathcal{K}}^{C}$ and superpixel feature output $h_{\mathcal{K}}^{C}$. Particularly, in one embodiment, the processor 110 determines the contrastive loss $\mathcal{L}$ as follows:

$$\mathcal{L} = -\sum_{C,\mathcal{K} \in P} \log \frac{\exp\left(f_{\mathcal{K}}^{C} \cdot \frac{h_{\mathcal{K}}^{C}}{\tau}\right)}{\sum_{C',\mathcal{K}' \in P} \exp\left(f_{\mathcal{K}'}^{C'} \cdot \frac{h_{\mathcal{K}'}^{C'}}{\tau}\right)}. \tag{3}$$

where $\tau$ is the temperature and P is the set of all superpixel superpoint matches with a positive number of radar points, such that $|O_{\mathcal{K}}^{C}|>0$. In one embodiment, the processor 110 only considers the matches that have at least one radar point and does not use the additional empty superpoints as negatives. In some embodiments, due to the sparsity of radar points, during the pre-training phase, the processor 110 determines the contrastive loss $\mathcal{L}$ using equation (3) with a batch of multiple shuffled scenes to make sure enough samples from all classes are involved.

The method 300 continues with training the first neural network based on the contrastive loss (block 340). Particularly, during each training cycle and/or after each batch of training data pairs pair $\langle P_t, I_t \rangle$, the processor 110 refines one or more components of the radar data processing model 30 based on the contrastive loss $\mathcal{L}$. The one or more components of the radar data processing model 30 that are refined at least includes the encoder 40 of the radar data processing model 30. In at least some embodiments, during such a refinement processes, the model parameters (e.g., model coefficients, machine learning model weights, etc.) of the radar data processing model 30 are modified or updated based on the contrastive loss $\mathcal{L}$ (e.g., using stochastic gradient descent or the like). The contrastive loss a matching between the corresponding superpoint feature $f_{\mathcal{K}}^{C}$ and superpixel feature $h_{\mathcal{K}}^{C}$ and not to similar other superpixel features $h_{\mathcal{K}}^{C}$, even on the same camera image.

In some embodiments, parameters (e.g., kernel weights, model coefficients, etc.) of the pre-trained image model 20 are frozen during the training of the radar data processing model 30 in the pre-training phase. In some embodiments, only the parameters of the encoder of the pre-trained image model 20 are frozen during the pre-training phase, and parameters of the decoder of the of the pre-trained image model 20 are trained jointly with the encoder 40 of the radar data processing model 30.

In this way, the radar data processing model 30 is pre-trained in a self-supervised fashion to extract latent features from radar point clouds, without the need for human annotation of the radar point clouds used in the training. Instead, the output features from the pre-trained image model 20 essentially serve as soft labels for the training process.

Returning to FIG. 3, the method 200 continues with receiving a plurality of annotated radar point clouds, the annotated radar point clouds having labels corresponding to a radar data processing task (block 230). Particularly, the processor 110 receives and/or the database 102 stores a plurality of annotated radar point clouds $\langle P_t, C_t \rangle$. Each annotated radar point cloud includes a radar point cloud in the same form as discussed above, denoted $P_t=(p_i)_{i=1,2,\ldots,n} \subseteq \mathbb{R}^{N \times Q}$, which is captured by a radar sensor, where t indicates a time at which the radar point cloud was captured, i is an index of each particular radar data point in the radar point cloud, N is a total number of points in the radar point cloud, and Q is the dimension of each radar data point in the radar point cloud. Each annotated radar point cloud further includes associated ground truth labels $C_t$ where the form of the labels $c_i$ corresponds to the particular downstream task for which the radar data processing model 30 is being trained, such as object detection or semantic segmentation. In one embodiment, each radar point of each annotated radar point cloud $P_t$ includes a respective classification label indicating, for example, whether or not the point corresponds to an object of a particular class or indicating a segmentation index, such that the associated ground truth labels $C_t$ take the form $C_t=(c_i)_{i=1,2,\ldots,n}$, where $c_i$ is the classification label for the point $p_i$ in $P_t$.

In general, because the radar data processing model 30 and, in particular, the encoder 40 of the radar data processing model 30, has already been pre-trained in a self-supervised fashion, the number of annotated radar point clouds in the plurality annotated radar point clouds is small compared to the quantity that would be required to train conventional radar data processing models. In this way, the annotated training dataset can be constructed by manual labelling of radar point clouds in a lower-resource setting and with lower costs.

The method 200 continues with further training, in a fine-tuning phase based on the plurality of annotated radar point clouds, the first neural network to perform the radar data processing task (block 240). Particularly, in the fine-tuning phase, for each annotated radar point cloud $\langle P_t, C_t \rangle$, the processor 110 provides the respective radar point cloud $P_t$ as an input to the encoder 40 of the radar data processing model 30, which generates latent representation of the respective radar point cloud $P_t$ in the form of a radar feature map $f_\theta$, as similarly discussed above. The radar feature map $f_\theta$ is provided to the decoder 50 of the radar data processing model 30, which generates a final model output, e.g., an object classification or semantic segmentation of the points in the radar point cloud $P_t$. The processor 110 determines a training loss based on a comparison of the final model output and the associated ground truth labels $C_t$. In at least one embodiment, the training loss is a cross-entropy loss. Finally, the processor 110 refines the radar data processing model 30 based on the training loss.

It should be appreciated that, after the pre-training phase, the radar data processing model 30 will already be well-trained for extracting a useful latent representation of the respective radar point cloud, as a result of the knowledge distillation process. However, the decoder 50 the radar data processing model 30 must still be trained to performed the designated downstream task and generate the desired final output. Accordingly, in at least one embodiment, the parameters (e.g., kernel weights, model coefficients, etc.) of the encoder 40 are frozen during the fine-tuning phase and only the parameters of the decoder 50 are refined during the fine-tuning phase.

In some embodiments, in which the associated ground truth labels $C_t$ are classification labels, such as for an object detection class, the processor 110 determines the training loss as a categorical cross-entropy loss, as follows:

$$\theta = \max_{\theta} \prod_{y} p(y; \theta). \tag{4}$$

where y is a binary indicator (0 or 1) if class label c is the correct classification for a radar point and p is the predicted probability of a class for this radar point. Similar to the pre-training phase, in at least some embodiments, the processor 110 determines the cross-entropy loss 0 using equation (4) with a batch of multiple shuffled frames to make sure enough samples from all classes are involved.

Experimental Results

In order to demonstrate the improvement provided by the training workflow 10, the performance of the system was tested with respect to the challenging object detection tasks. To ensure real-world performance, a prototype of the system was implemented and selected to test on autonomous driving data.

The experiments were conducted on the nuScenes Dataset, which is the first dataset that contains aligned camera and radar sensors, as well as sufficient radar measurements (18 features per point, including doppler velocity, RCS, depth, etc) for autonomous driving. Compared to other datasets in the same domain, nuScenes has the largest sample size and the most comprehensive radar data, which is useful as the model needs to use the different features specific to radar data to perform downstream tasks, as models that are commonly based on LiDAR do not work well in this context. The nuScenes dataset contains 700 scenes for training and 150 scenes for validation. In this experiment, the pre training models are trained with 700 training scenes, while the downstream models are trained with 600 scenes and evaluated on the rest 100 scenes as mini-validation for selecting the parameters, the performance of the whole pipeline is tested with 150 validation scenes.

Although providing affluent radar measurements such as RCS and doppler velocity, the raw radar data on nuScenes Dataset does not come with ground truth labeling, which on the other hand, reflects the difficulty of manually labeling each radar point. In order to conduct the experiment, the ground truth labels were leveraged from aligned LiDAR data collected alongside the camera and radar. LiDAR has an order of magnitude more points compared to radar, making it sufficient to find a close enough match for radar points. Each radar point was transformed from the radar frame onto the global ego frame, and its coordinates were compared with the transformed LiDAR points on the ego frame. The nearest points were selected and the LiDAR label was applied as the label of this radar point. To guarantee that the matched radar and LiDAR point belong to the same object, and ensure enough radar points are selected for our experiment, it was necessary to carefully select a distance threshold between matched radar and LiDAR points. It was noted that the range and resolution of depth on the radar points (distance to the front) is significantly larger than the two other axes, upon calculating the distance between radar and LiDAR points, and a relative distance was calculated with a compensation factor of 0.13 multiplying by depth to best balance this fact.

Another challenge was to choose the appropriate relative distance, whereupon visual verification on multiple keyframes, a 1.5 m threshold was chosen to best balance the accuracy and availability of radar points. The radar and LiDAR points are mostly aligned though, with most matched points within 10 cm apart from each other. In this dataset, Lidar only has a range of 105 m, compared to the 250 m range of depth on the radar. As a result, radar points outside the LiDAR range were discarded because they do not have a reference point that is within the distance threshold. 100 frames were manually checked to ensure the annotated labels using this method are accurate.

Performing object detection on the sparse radar point cloud is a challenging task. In the experiments, object detection was conducted on 3 categories used in NVRadarNet as targets: car, pedestrian, and bicycle.

In at least some embodiments, the backbone of the radar data processing model 30 described herein is a sparse residual U-Net architecture. 3×3×3 kernels were applied for all sparse convolutions. As for input, it takes a sparse occupancy grid of the 3D radar data, obtained from voxels in cylindrical coordinates which is better fitted for Radar data. The radar data has an input feature of depth, RCS, and doppler velocity, which feed into the radar data processing model 30 and output a size of 64 latent features to align with the image model. In order to balance the input features, RCS was multiplied by 1000 and doppler velocity on each axis was multiplied by 10000. Self-supervised learning relies heavily on data augmentation. On the image side, two augmentation methods were used: random crop and random flip. On the point side, a random flip was applied around the front-facing direction.

The neural networks were trained using 1 GPU for 50 epochs, using SGD and an initial learning rate of 0.05, a momentum of 0.9, a dampening of 0.1, and a weight decay of 0.0001. A batch size of 32 and a dropout rate of 0.5 were used.

Although there are prior works in knowledge distillation on LiDAR point clouds, they perform poorly when applied to the radar point clouds mainly due to sparsity. A baseline was implemented as a comparison to our 3D pre-training approach: a fully-connected neural network (FCN) for the object detection tasks.

To compare the training workflow 10 with a conventional CNN network using all the training data, a fully-connect neural network (FCN) was built consisting of three linear layers followed by a linear activation (ReLU) and a dropout layer. The performance of this FCN method was compared with the downstream results using the training workflow 10.

All baselines models were trained using the same nuScenes training set, using 1 GPU, and tested under the nuScenes validation set.

The performance of FCN and the training workflow 10 on the nuScenes validation dataset for the object detection task is shown in Table I, and Table II.

Table I, below, shows a performance of an FCN network using valid radar points on the nuScenes dataset (100% training set):

| FCN | mIoU | fwIoU |
|---|---|---|
| | 28.3 | 72.1 |

Table II, below, shows a performance of the training workflow 10 using valid radar points on the nuScenes dataset.

| Training Workflow 10 | 5% | 10% | 20% | 100% |
|---|---|---|---|---|
| mIoU | 32.5 | 32.3 | 33.5 | 35.9 |
| fwIoU | 74.7 | 74.9 | 75.2 | 76.2 |

As can be observed, the knowledge distillation process described herein performs better than the conventional FCN approach. Additionally, the amount of required annotated data in the downstream task is greatly reduced using the knowledge distillation process described herein.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for training a first neural network to perform a radar data processing task, the method comprising:

receiving, with a processor, a plurality of training data pairs, each respective training data pair in the plurality of training data pairs including a respective image and a respective radar point cloud, which were captured synchronously with one another of a same scene;

training, with the processor, in a first phase based on the plurality of training data pairs, the first neural network to extract features from radar point clouds using a second neural network that is pre-trained to extract features from images;

receiving, with the processor, a plurality of annotated radar point clouds, the annotated radar point clouds having labels corresponding to a radar data processing task; and further training, with the processor, in a second phase based on the plurality of annotated radar point clouds, the first neural network to perform the radar data processing task.

2. The method according to claim 1, wherein:

the first neural network comprises an encoder followed by a decoder, the training the first neural network in the first phase comprises training the encoder of the first neural network using the second neural network and based on the plurality of training data pairs; and the training the first neural network in the second phase comprises training the decoder of the first neural network based on the plurality of annotated radar point clouds.

3. The method according to claim 2, wherein parameters of the encoder of the first neural network are frozen during training the decoder of the first neural network in the second phase.

4. The method according to claim 1, wherein parameters of the second neural network are frozen during the training the first neural network in the first phase.

5. The method according to claim 1, the training the first neural network in the first phase comprising:

determining, using the first neural network, a first feature output based on a respective radar point cloud in the plurality of training data pairs;

determining, using the second neural network, a second feature output based on a respective image in the plurality of training data pairs that corresponds to the respective radar point cloud; and refining the first neural network based on the first feature output and the second feature output.

6. The method according to claim 5, the training the first neural network in the first phase comprising:

determining a mapping between (i) points of radar point clouds in the plurality of training data pairs and (ii) pixels of images in the plurality of training data pairs.

7. The method according to claim 6, the training the first neural network in the first phase comprising:

determining a contrastive loss based on the first feature output and the second feature output and based on the mapping; and refining the first neural network based on the contrastive loss.

8. The method according to claim 7, the training the first neural network in the first phase comprising:
segmenting the respective radar point cloud into superpoints, each superpoint including a subset of points from the respective radar point cloud; and
segmenting the respective image into superpixels, each superpixel including a subset of pixels from the respective image.

9. The method according to claim 8, the training the first neural network in the first phase comprising:
determining, for each respective superpoint in the respective radar point cloud, a respective superpoint feature output;
determining, for each respective superpixel in the respective image, a respective superpixel feature output; and
determining the contrastive loss based on the respective superpoint feature output of each superpoint in the respective radar point cloud and the respective superpixel feature output of each superpixel in the respective image.

10. The method according to claim 9, the training the first neural network in the first phase comprising:
matching each superpoint in the respective radar point cloud to a respective superpixel in the respective image; and
determining the contrastive loss based on the respective superpoint feature output and the respective superpixel feature output of each matched superpoint and superpixel.

11. The method according to claim 9, the determining the respective superpoint feature output further comprising:
determining the respective superpoint feature output as a weighted average of features in the first feature output for points of the respective superpoint, the average being weighted depending on an average distance of each point with each other point in the respective superpoint.

12. The method according to claim 9, the determining the respective superpixel feature output further comprising:
determining the respective superpixel feature output as an average of features in the second feature output for pixels of the respective superpixel.

13. The method according to claim 8, the segmenting the respective image into superpixels further comprising:
defining each superpixel of the respective image by applying at least one of an image segmentation algorithm and a pixel clustering algorithm to the respective image.

14. The method according to claim 13, the segmenting the respective radar point cloud into superpoints further comprising:
matching each point in the respective radar point cloud to a respective superpixel in the respective image; and
defining each superpoint of the respective radar point cloud as a group of radar points that match to a same superpixel in the respective image.

15. The method according to claim 8, the segmenting the respective radar point cloud into superpoints further comprising:
defining each superpoint of the respective radar point cloud by applying a point clustering algorithm to the respective radar point cloud.

16. The method according to claim 15, the segmenting the respective image into superpixels further comprising:
matching each superpixel in the respective image to a respective superpoint in the respective radar point cloud; and
defining each superpixel of the respective image as a group of pixels that match to a same superpoint in the respective radar point cloud.

17. The method according to claim 15, the segmenting the respective image into superpixels further comprising:
initially defining superpixels of the respective image by applying at least one of an image segmentation algorithm and a pixel clustering algorithm to the respective image;
matching each initially defined superpixel in the respective image to a respective superpoint in the respective radar point cloud; and
defining each superpixel of the respective image as a group of initially defined superpixels that match to a same superpoint in the respective radar point cloud.

18. The method according to claim 15, the applying the point clustering algorithm to the respective radar point cloud further comprising:
generating a respective combined radar point cloud by combining the respective radar point cloud with at least one further radar point cloud that was captured at an immediately previous or subsequent time compared to a time at which the respective radar point cloud was captured.

19. The method according to claim 18, the applying the point clustering algorithm to the respective radar point cloud further comprising:
defining each superpoint of the respective radar point cloud by applying a point clustering algorithm to the respective combined radar point cloud.

20. A non-transitory computer-readable medium for training a first neural network to perform a radar data processing task, the non-transitory computer-readable medium storing program instructions that, when executed by a processor, cause the processor to:
receive a plurality of training data pairs, each respective training data pair in the plurality of training data pairs including a respective image and a respective radar point cloud, which were captured synchronously with one another of a same scene;
train, in a first phase based on the plurality of training data pairs, the first neural network to extract features from radar point clouds using a second neural network that is pre-trained to extract features from images;
receive a plurality of annotated radar point clouds, the annotated radar point clouds having labels corresponding to a radar data processing task; and
further train, in a second phase based on the plurality of annotated radar point clouds, the first neural network to perform the radar data processing task.

* * * * *